(12) United States Patent
Chen

(10) Patent No.: US 12,262,394 B2
(45) Date of Patent: Mar. 25, 2025

(54) NETWORK SWITCHING METHOD

(71) Applicant: VIVO MOBILE COMMUNICATION CO., LTD., Guangdong (CN)

(72) Inventor: Li Chen, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 373 days.

(21) Appl. No.: 17/579,168

(22) Filed: Jan. 19, 2022

(65) Prior Publication Data

US 2022/0141742 A1 May 5, 2022

Related U.S. Application Data

(63) Continuation of application No. PCT/CN2020/106164, filed on Jul. 31, 2020.

(30) Foreign Application Priority Data

Jul. 31, 2019 (CN) .......................... 201910704626.3

(51) Int. Cl.
| | |
|---|---|
| *H04W 72/25* | (2023.01) |
| *H04W 36/00* | (2009.01) |
| *H04W 36/34* | (2009.01) |
| *H04W 76/10* | (2018.01) |
| *H04W 76/30* | (2018.01) |
| *H04W 88/04* | (2009.01) |

(52) U.S. Cl.
CPC ....... *H04W 72/25* (2023.01); *H04W 36/0064* (2023.05); *H04W 36/34* (2013.01); *H04W 88/04* (2013.01); *H04W 36/0077* (2013.01); *H04W 76/10* (2018.02); *H04W 76/30* (2018.02)

(58) Field of Classification Search
CPC ................. H04W 72/20; H04W 72/25; H04W 36/00–385; H04W 88/04
See application file for complete search history.

(56) References Cited

U.S. PATENT DOCUMENTS

| | | | | |
|---|---|---|---|---|
| 10,512,023 | B2* | 12/2019 | Lee | H04W 72/542 |
| 10,517,033 | B2* | 12/2019 | Vutukuri | H04W 4/10 |
| 10,827,407 | B2* | 11/2020 | Wang | H04W 36/08 |
| 11,129,068 | B2* | 9/2021 | Yang | H04W 36/0009 |

(Continued)

FOREIGN PATENT DOCUMENTS

| | | |
|---|---|---|
| CN | 104272802 A | 1/2015 |
| CN | 105530673 A | 4/2016 |

(Continued)

OTHER PUBLICATIONS

LG Electronics Inc., Options for Path Switching, 3GPP TSG-RAN WG2 Meeting #98, R2-1704537, May 15-19, 2017, Hangzhou, China.

(Continued)

*Primary Examiner* — Brendan Y Higa
(74) *Attorney, Agent, or Firm* — IP & T GROUP LLP

(57) ABSTRACT

A network switching method includes: in the case that a first network connection is established between the network device and a first terminal, instructing the first terminal to make a network connection with the network device through a second terminal. The first terminal is connected to the second terminal through a second network, and the second terminal is connected to the network device through the first network.

15 Claims, 3 Drawing Sheets

Start

In the case that a first network connection is established between a network device and a first terminal, instruct the first terminal to make a network connection with the network device through a second terminal; where the first terminal is connected to the second terminal through a second network, and the second terminal is connected to the network device through a first network. — 101

End

(56) References Cited

U.S. PATENT DOCUMENTS

| | | | | |
|---|---|---|---|---|
| 2010/0260096 | A1* | 10/2010 | Ulupinar | H04B 7/2606 370/315 |
| 2010/0290430 | A1* | 11/2010 | Lee | H04W 36/385 370/331 |
| 2012/0051283 | A1* | 3/2012 | Takahashi | H04W 72/23 370/315 |
| 2012/0069789 | A1* | 3/2012 | Hapsari | H04W 36/0016 370/315 |
| 2012/0093125 | A1* | 4/2012 | Hapsari | H04W 36/0016 370/331 |
| 2012/0099516 | A1* | 4/2012 | Hapsari | H04W 36/06 370/315 |
| 2012/0106435 | A1* | 5/2012 | Hapsari | H04W 36/0016 370/315 |
| 2013/0267224 | A1 | 10/2013 | Krishnaswamy et al. | |
| 2016/0212682 | A1* | 7/2016 | Chung | H04W 76/14 |
| 2016/0316425 | A1 | 10/2016 | Cili et al. | |
| 2017/0295178 | A1 | 10/2017 | Cheng et al. | |
| 2018/0027429 | A1* | 1/2018 | Li | H04W 8/24 455/426.1 |
| 2018/0070400 | A1* | 3/2018 | Wu | H04W 4/06 |
| 2018/0098370 | A1* | 4/2018 | Bangolae | H04W 88/04 |
| 2018/0167986 | A1 | 6/2018 | Lin et al. | |
| 2018/0199312 | A1* | 7/2018 | Wu | H04B 7/155 |
| 2018/0317268 | A1* | 11/2018 | Kim | H04W 8/24 |
| 2019/0223066 | A1 | 7/2019 | Xu et al. | |
| 2019/0320361 | A1* | 10/2019 | Uchiyama | H04W 88/04 |
| 2019/0327653 | A1 | 10/2019 | Jin et al. | |
| 2019/0387446 | A1 | 12/2019 | Xu et al. | |
| 2020/0029384 | A1* | 1/2020 | Hong | H04W 36/305 |
| 2020/0059843 | A1 | 2/2020 | Tang | |
| 2021/0058985 | A1* | 2/2021 | Fujishiro | H04W 48/08 |

FOREIGN PATENT DOCUMENTS

| | | |
|---|---|---|
| CN | 105764105 A | 7/2016 |
| CN | 106131899 A | 11/2016 |
| CN | 107005904 A | 8/2017 |
| CN | 107852759 A | 3/2018 |
| CN | 109005594 A | 12/2018 |
| CN | 109076343 A | 12/2018 |
| CN | 109691174 A | 4/2019 |
| EP | 3445087 A1 | 2/2019 |
| EP | 3706466 A1 | 9/2020 |
| WO | 2015/062643 A1 | 5/2015 |
| WO | 2017/214975 A1 | 12/2017 |
| WO | 2018/129875 A1 | 7/2018 |
| WO | 2018/148890 A1 | 8/2018 |
| WO | 2018/194617 A1 | 10/2018 |

OTHER PUBLICATIONS

Huawei and Hisilicon, Path Switch Procedure between Uu and PC5, 3GPP TSG-RAN WG2 Meeting #98, R2-1704715, May 15-19, 2017, Hangzhou, China.

3rd Generation Partnership Project; Technical Specification Group Services and System Aspects; Study on Architecture Enhancements to ProSe UE-to-Network Relay (Release 15), 3GPP TR 23.733 V15.1.0, Dec. 2017.

Extended European Search Report for the European Patent Application No. 20845991.7 issued by the European Patent Office on Aug. 12, 2022.

The First Office Action of Priority Application No. CN 201910704626.3 issued by the Chinese Patent Office on Mar. 8, 2021.

The Second Office Action of Priority Application No. CN 201910704626.3 issued by the Chinese Patent Office on Aug. 6, 2021.

International Search Report and Written Opinion of Priority Application No. PCT/CN2020/106164 issued by the Chinese Patent Office on Nov. 10, 2020.

\* cited by examiner

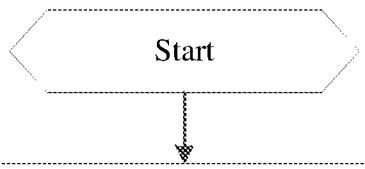

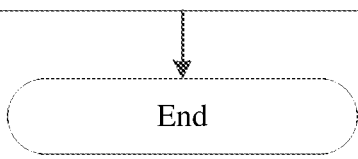

In the case that a first network connection is established between a network device and a first terminal, instruct the first terminal to make a network connection with the network device through a second terminal; where the first terminal is connected to the second terminal through a second network, and the second terminal is connected to the network device through a first network. — 101

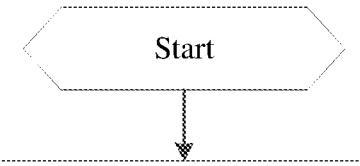

FIG. 1

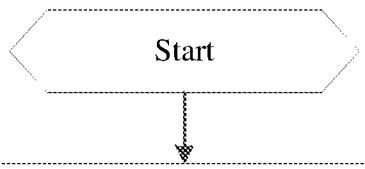

In the case that a first network connection is established between a first terminal and a network device, establish a second network connection with a second terminal, and make a network connection with the network device through the second terminal; where the second terminal is connected to the network device through a first network. — 201

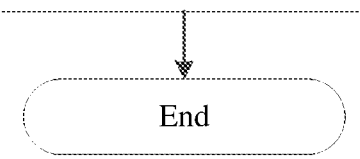

FIG. 2

NETWORK SWITCHING METHOD

CROSS-REFERENCE TO RELATED APPLICATIONS

This application is a Bypass Continuation application of PCT/CN2020/106164 filed on Jul. 31, 2020, which claims priority to Chinese Patent Application No. 201910704626.3 filed on Jul. 31, 2019, which are incorporated herein by reference in their entirety.

TECHNICAL FIELD

The present disclosure relates to the field of communication technologies, and in particular to a network switching method, a network device and a terminal.

BACKGROUND

A current network connection method for a wearable device includes: the wearable device is connected to a terminal of the cellular network connection type through a non-cellular network, and the terminal of the cellular network connection type communicates with a network device through a cellular network, so as to achieve communication between the wearable device and the network device through the terminal of the cellular network connection type; or the wearable device is directly connected to the network device through the cellular network and communicates through the network device.

SUMMARY

The present disclosure provides a network switching method, a network device and a terminal.

According to a first aspect, some embodiments of the present disclosure provide a network switching method applied to a network device and including:
  in the case that a first network connection is established between the network device and a first terminal, instructing the first terminal to make a network connection with the network device through a second terminal;
  where the first terminal is connected to the second terminal through a second network, and the second terminal is connected to the network device through a first network.

According to a second aspect, some embodiments of the present disclosure further provide a network switching method applied to a first terminal and including:
  in the case that a first network connection is established between the first terminal and a network device, establishing a second network connection with a second terminal, and making a network connection with the network device through the second terminal;
  where the second terminal is connected to the network device through a first network.

According to a third aspect, some embodiments of the present disclosure further provide a network switching method applied to a second terminal and including:
  in the case that a first network connection is established between a first terminal and a network device, establishing a second network connection with the first terminal, and establishing the first network connection with the network device.

According to a fourth aspect, some embodiments of the present disclosure further provide a network device including:
  a control module, or camps on or is non-activated with instruct, in the case that a first network connection is established between the network device and a first terminal, the first terminal to make a network connection with the network device through a second terminal;
  where the first terminal is connected to the second terminal through a second network, and the second terminal is connected to the network device through a first network.

According to a fifth aspect, some embodiments of the present disclosure further provide a network device including: a memory, a processor, and a computer program that is stored in a memory and executable on a processor, where the computer program implements steps of the foregoing network switching method when executed by the processor.

According to a sixth aspect, some embodiments of the present disclosure further provide a terminal, where the terminal is a first terminal and includes:
  a first network connection module, configured to establish, in the case that the first network connection is established between the first terminal and a network device, a second network connection with a second terminal, and make a network connection with the network device through the second terminal;
  where the second terminal is connected to the network device through a first network.

According to a seventh aspect, some embodiments of the present disclosure further provide a terminal, where the terminal is a first terminal and includes a memory, a processor, and a computer program that is stored in a memory and executable on a processor, and the computer program implements steps of the foregoing network switching method when executed by the processor.

According to an eighth aspect, some embodiments of the present disclosure further provide a terminal, where the terminal is a second terminal and includes:
  a second network connection module, configured to establish, in the case that a first network connection is established between a first terminal and a network device, a second network connection with the first terminal and establish the first network connection with the network device.

According to a ninth aspect, some embodiments of the present disclosure further provide a terminal, where the terminal is a second terminal and includes a memory, a processor, and a computer program that is stored in a memory and executable on a processor, and the computer program implements steps of the foregoing network switching method when executed by the processor.

According to a tenth aspect, some embodiments of the present disclosure further provide a non-transitory computer-readable storage medium having a computer program stored thereon, where the computer program implements steps of the foregoing network switching method when executed by a processor.

BRIEF DESCRIPTION OF DRAWINGS

To better clarify the technical solutions in the embodiments of the present disclosure, the accompanying drawings for describing the embodiments of the present disclosure are briefly described below. Apparently, the accompanying drawings described below merely illustrate some of the embodiments of the present disclosure. Persons of ordinary skill in the art can derive other accompanying drawings from these accompanying drawings.

FIG. 1 illustrates a schematic flowchart 1 of a network switching method according to some embodiments of the present disclosure;

FIG. 2 illustrates a schematic flowchart 2 of a network switching method according to some embodiments of the present disclosure;

DESCRIPTION OF EMBODIMENTS

Figure 3:
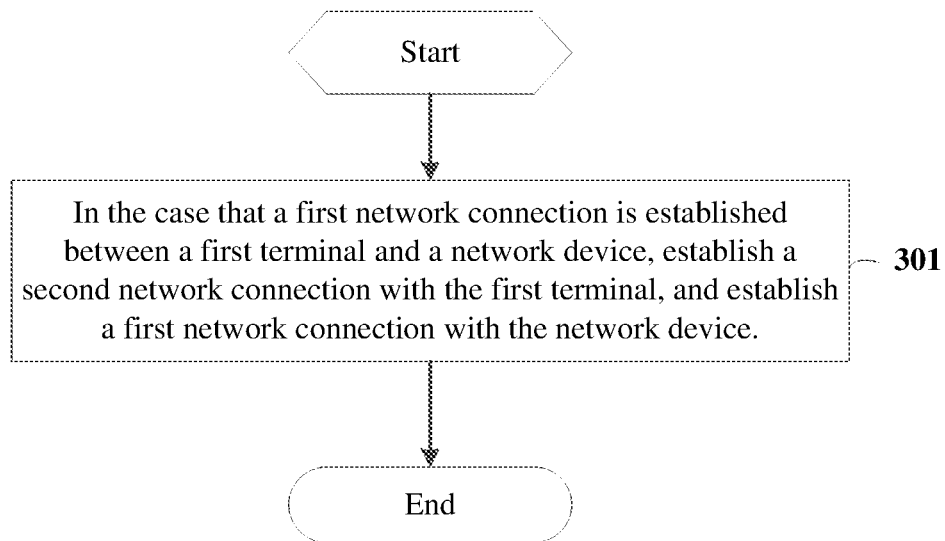
FIG. 3 illustrates a schematic flowchart 3 of a network switching method according to some embodiments of the present disclosure.

To make the objectives, technical solutions, and advantages of the present disclosure clearer, the following further describes the present disclosure in detail with reference to the accompanying drawings and specific embodiments.

General, in a scenario of switching from a cellular network connection to a non-cellular network connection with the network device when a wearable device is in the connected state, a terminal first disconnects the original cellular network connection, and then connects, through a non-cellular network, to another terminal device which connects to a cellular network to indirectly achieve communication. Due to the conversion of network connections, the service may be interrupted.

The present disclosure provides a network switching method, a network device and a terminal with respect to the problem of service interruption when a cellular network connection between a terminal and a network device is switched to a non-cellular network connection in the related art.

As shown in FIG. 1, some embodiments of the present disclosure provide a network switching method applied to a network device and including:

Step 101: in the case that a first network connection is established between the network device and a first terminal, instructing the first terminal to make a network connection with the network device through a second terminal;

where the first terminal is connected to the second terminal through a second network, and the second terminal is connected to the network device through a first network.

It should be noted that the first terminal making a network connection with the network device through a second terminal means that the first terminal and the second terminal are connected through a second network, and the second terminal and the network device are connected through a first network, so that the first terminal is indirectly connected to the network device through the second terminal.

The first network connection means that the first terminal or the second terminal is connected to or camps on or non-activated with a cellular network for the network device; the second network connection means a non-cellular network connection between the first terminal and the second terminal.

It should be noted that, the first terminal or the second terminal is connected to or camps on or is non-activated with a cellular network for the network device means that: the first terminal is connected to or camps on a cellular network in RRC_Connected mode, RRC_Idle mode, or RRC_Inactive mode, or the second terminal is connected to or camps on a cellular network in RRC_Connected mode, RRC_Idle mode, or RRC_Inactive mode.

In some embodiments of the present disclosure, the first terminal or the second terminal is connected to a network via a cellular network, where the cellular network includes a 2nd generation mobile communication network (2G), a 3rd generation mobile communication network (3G), and a 4th generation mobile communication network (4G), a 5th generation mobile communication network (5G), and an evolved cellular communication system in the future.

The first terminal may be a wearable device (such as a watch, a headset, glasses, a bracelet, or the like), and the second terminal may be another terminal device (such as a mobile phone, a personal computer, a notebook computer, a handheld computer, or the like); or the second terminal may be a wearable device (such as a watch, a headset, glasses, a bracelet, or the like), and the first terminal may be another terminal device (such as a mobile phone, a personal computer, a notebook computer, a handheld computer, or the like).

In the case that the first terminal is a wearable device, and the second terminal is another terminal device, or the second terminal is a wearable device, and the first terminal is another terminal device, a relationship between the wearable device and the another terminal device may be: different subscriber identification modules using a same number; different terminals using a same number; a wearable device using a universal subscriber identity module, and another terminal device using an embedded subscriber identification module; using different numbers; using two numbers having a binding relationship.

In the case that the first network connection is established between the network device and a first terminal, instructing the first terminal to make a network connection with the network device through a second terminal can reduce service interruptions during network switching, and ensure service continuity when a cellular network connection between a terminal and a network device is switched to a non-cellular network connection.

It should be noted that, in the embodiments of the present disclosure, the network device may be a same base station, or may include two different base stations, namely a first base station and a second base station, and the first base station and the second base station can communicate. In the case that the network device is a same base station, the base station can establish the first network connection with the first terminal and the second terminal separately, and the base station can implement information interaction such as sending a request, receiving a response or receiving an instruction with the first terminal or the second terminal.

In the case that the network device includes a first base station and a second base station, the first terminal and the first base station are connected through a first network, and information interaction such as sending a request, receiving a response or receiving an instruction can be implemented between the first base station and the first terminal; the second terminal and the second base station are connected through a first network, and information interaction such as sending a request, receiving a response or receiving an instruction can be implemented between the second base station and the second terminal.

Optionally, the method further includes:
releasing the first network connection with the first terminal.

After the first terminal is connected to the network device through the second terminal, the first terminal can communicate with the network device through the second terminal. At this time, the network device may release the first network connection with the first terminal, and a cellular network connection between the first terminal and the network device is switched to indirect communication with the network device through the second terminal, thereby ensuring service continuity of a terminal during network connection.

It should be noted that some embodiments of the present disclosure are applicable to switching some or all of services of the first terminal under the first network connection mode to a direct non-cellular network connection with the second terminal, which is implemented through the cellular network connection between the second terminal and the network device. Optionally, before the step 101, the method further includes:
receiving a first network switching request sent by the first terminal; or
receiving a second network switching request sent by the second terminal.

When the first network connection between the first terminal and the network device needs to be switched to a network connection with the network device through a second terminal, switching the network connections may be triggered by the first terminal or switching the network connections may be triggered by the second terminal. The receiving a first network switching request sent by the first terminal is the switching the network connections triggered by the first terminal, and the receiving a second network switching request sent by the second terminal is the switching the network connections triggered by the first terminal. Some embodiments of the present disclosure will be specifically described below from different perspectives of triggering by the first terminal and triggering by the second terminal.

Manner 1: the first terminal sends a first network switching request, and the network device receives the first network switching request sent by the first terminal.

It should be noted that the first network switching request includes at least one of the following:

A11. a request message for releasing the first network connection between the first terminal and the network device;
optionally, the first network connection here may be that the first terminal is connected to or camps on or non-activated with a cellular network for the network device, and the first terminal requests the network device to disconnect or release the cellular network connection.

A12. a request message for the first terminal to perform network connection switching, where the network connection switching includes that the first network connection between the first terminal and the network device is switched to a second network connection between the first terminal and the second terminal;

optionally, the first terminal requests the network device to perform network connection switching, where the network connection switching means that: a cellular network connection between the first terminal and the network device is switched to a non-cellular connection between the first terminal and the second terminal.

A13. a message that the first terminal and the second terminal are connected through a second network;
optionally, after the first terminal has a non-cellular connection with the second terminal or when a non-cellular connection is to be made between the first terminal and the second terminal, the first switching request message carries a notification message to the network device.

A14. a request message for switching a preset service from the first terminal to the second terminal;
optionally, the preset service is all or some of current services of the first terminal. The first terminal sends a request message to the network device to request switching execution of the preset service by the first terminal directly with the network device to execution of the preset service by the first terminal with the network device through the second terminal. For example, the preset service may be a voice service in a call. A service other than a voice service, such as a data service, may be switched or not switched, that is, remain in a suspended state.

A15. identification information of the second terminal;
optionally, the second terminal refers to a second terminal bound to the first terminal. The first network switching request sent by the first terminal to the network device carries the identification information of the second terminal, so that the first terminal and the second terminal establish a second network connection.

A16. auxiliary information sent by the second terminal to the first terminal.
optionally, after the first terminal and the second terminal are connected through the second network, the second terminal sends the auxiliary information to the first terminal in real time, where the auxiliary information may include: configuration information or measurement information required for the second terminal to access a network.

It should be noted that the first terminal may establish a second network connection with the second terminal first, and then send the first network switching request to the network device, or it may send the first network switching request to the network device first, and then establish a second network connection with the second terminal.

It should be noted that the identification information of the second terminal sent by the first terminal to the network device may be the identification information of the second terminal bound to the first terminal.

Optionally, the first terminal and the second terminal have a binding relationship. In this way, using the technical solutions of some embodiments of the present disclosure can implement paging to multiple terminals having a binding relationship at the same time. The binding relationship between terminals means that there is a binding relationship between terminal IDs, or there is a binding relationship between subscriber identification modules (SIM) or embedded SIM cards (eSIM) or universal subscriber identity modules (USIM) or corresponding numbers of the terminals. Such a binding relationship may be acquired from a core network entity through a base station, or reported by a terminal.

Manner 2: The second terminal sends a second network switching request, and the network device receives the second network switching request sent by the second terminal.

It should be noted that the second network switching request includes at least one of the following:

B11. a radio resource control (RRC) connection establishment request message;

optionally, when the second terminal sends a second network switching request to the network device, the second network switching request carries an RRC connection establishment request message to request the establishment of an RRC connection with the network device.

B12. identification information of the first terminal;

optionally, the second terminal needs to send the identification information of the first terminal to the network device when initiating a network switching request to the network device, so that the network device instructs the first terminal to make a network connection with the network device through the second terminal; the identification information of the first terminal may also be used for the network device to release the first network connection with the first terminal.

B13. a request message for releasing the first network connection between the first terminal and the network device;

optionally, the first network connection here may be that the first terminal is connected to or camps on or non-activated with a cellular network for the network device, and the second terminal requests the network device to release a cellular network connection between the network device and the first terminal.

B14. a request message for the first terminal to perform network connection switching, where the network connection switching includes switching the first network connection between the first terminal and the network device to a second network connection between the first terminal and the second terminal;

optionally, when the second terminal sends a network switching request to the network device, a request message that the first terminal needs to perform network switching is carried. After the first terminal establishes a network connection with the second terminal, the second terminal may acquire a notification message requiring network switching from the first terminal.

B15. a message that the first terminal and the second terminal are connected through a second network;

optionally, after the first terminal has a non-cellular connection with the second terminal or when a non-cellular connection is to be made between the first terminal and the second terminal, the second switching request message carries a notification message to the network device.

B16. a request message for switching a preset service from the first terminal to the second terminal;

optionally, the preset service is all or some of current services of the first terminal. When the second terminal sends a network switching request to the network device, a request message for switching the preset service from the first terminal to the second terminal is carried.

B17. identification information of the second terminal;

optionally, when the second terminal sends a network switching request to the network device, the identification information of the second terminal is carried, so that the network device establishes a network connection with the second terminal; the identification information of the second terminal may also be used for the network device to instruct the first terminal to establish a second network connection with the second terminal.

B18. auxiliary information sent by the second terminal to the first terminal.

optionally, after a second network connection is established between the first terminal and the second terminal, the second terminal sends auxiliary information to the first terminal in real time, and the auxiliary information is carried when the second terminal sends a network switching request to the network device. The auxiliary information may include: configuration information or measurement information required for the second terminal to access a network.

It should be noted that the second terminal may establish a second network connection with the first terminal first, and then send the second network switching request to the network device, or it may send the second network switching request to the network device first, and then establish a second network connection with the first terminal.

It should be noted that in the case that the network device is a same base station, the base station receives a first network switching request sent by the first terminal; or receives a second network switching request sent by the second terminal. In the case that the network device includes a first base station and a second base station, the first base station receives a first network switching request sent by the first terminal; the second base station receives a second network switching request sent by the second terminal.

In some embodiments, the instructing the first terminal to make a network connection with the network device through a second terminal includes:

sending first response information to the first terminal.

After receiving a first network switching request sent by the first terminal, or receiving a second network switching request sent by the second terminal, the network device sends a response message to the first terminal for instructing the first terminal to make a network connection with the network device through a second terminal. Here in the case that the network device includes a first base station and a second base station, first response information is sent by the first base station to the first terminal.

It should be noted that the first response information is response information sent by the network device according to a first network switching request received from the first terminal, and/or according to a received second network switching request sent by the second terminal.

It should be noted that the first response information includes at least one of the following:

C11. an acknowledgment message;

optionally, the acknowledgment message is a request acknowledgment message, which is used to confirm or deny the previous request sent by the first terminal or the second terminal to the network device.

C12. identification information of the second terminal;

optionally, the network device sends the first response information to the first terminal, and the first response information carries the identification information of the second terminal, so that the first terminal and the second terminal establish a second network connection.

C13. a RRC connection release message;

optionally, when a cellular network connection between the first terminal and the network device is switched to a non-cellular connection between the first terminal and the second terminal, the network device may release the first network connection with the first terminal and send the RRC connection release message to the first terminal.

C14. instruction information for instructing the second terminal to initiate RRC connection establishment to the network device through the first terminal;
  optionally, if the first terminal needs to perform network switching, and the second terminal is not connected with the network device when the first terminal receives the first response information, the first terminal may instruct the second terminal to initiate access to the network device according to the instruction information, so that the second terminal is connected with the network device through a first network.

C15. a paging message sent to the second terminal.
  optionally, if the network device initiates a paging to the second terminal, the first response information may carry the paging message sent by the network device to the second terminal when the first response information is sent to the first terminal.

In some embodiment, the instructing the first terminal to make a network connection with the network device through a second terminal includes:
  sending first instruction information to the second terminal.

It should be noted that the first instruction information is instruction information sent by the network device according to a first network switching request received from the first terminal and/or according to a received second network switching request sent by the second terminal. The first instruction information may be used to instruct that the first terminal needs to make a network connection with the network device through the second terminal. Here in the case that the network device includes a first base station and a second base station, the first response information is sent by the second base station to the second terminal.

It should be noted that the first instruction information includes at least one of the following:

D11. an acknowledgment message;
  optionally, the acknowledgment message is a request acknowledgment message, which is used to confirm or deny the previous request sent by the first terminal or the second terminal to the network device.

D12. a paging message sent to the second terminal;
  optionally, after receiving a first network switching request sent by the first terminal, or receiving a second network switching request sent by the second terminal, the network device initiates a paging to the second terminal to trigger the establishment of a network connection between the second terminal and the network device.

D13. identification information of the first terminal;
  optionally, the network device sends the identification information of the first terminal to the second terminal, so that the second terminal and the first terminal establish a second network connection.

D14. instruction information for releasing the first network connection between the first terminal and the network device;
  optionally, the network device sends the instruction information to the second terminal, and after establishing a second network connection with the first terminal, the second terminal instructs the first terminal to request the network device to release the first network connection.

D15. instruction information for the first terminal to perform network connection switching, where the network connection switching includes switching the first network connection between the first terminal and the network device to a second network connection between the first terminal and the second terminal;
  optionally, after acquiring the instruction message and establishing a second network connection with the first terminal, the second terminal may instruct the first terminal to perform network connection switching.

D16. instruction information for the first terminal and the second terminal to connect through a second network;
  optionally, the network device sends the instruction message to the second terminal, so that the second terminal and the first terminal establish a second network connection.

D17. a request message for switching a preset service from the first terminal to the second terminal.
  optionally, the preset service is all or some of current services of the first terminal. When the network device sends the first instruction information to the second terminal, a request message for switching the preset service from the first terminal to the second terminal is carried, so that the second terminal knows that the preset service needs to be switched from the first terminal to the second terminal. For example, the preset service may be a voice service in a call. A service other than a voice service, such as a data service, may be switched or not switched, that is, remain in a suspended state.

In some embodiments, the instructing the first terminal to make a network connection with the network device through a second terminal includes:
  receiving second response information sent by the second terminal.

Optionally, the second response information may be response information fed back by the second terminal after receiving the first instruction information sent by the network device and performing a corresponding step according to the first instruction information. Here in the case that the network device includes a first base station and a second base station, second response information is sent by the second base station to the second terminal.

It should be noted that the second response information includes at least one of the following:
  an acknowledgment response message;
  a RRC connection establishment request message; and
  identification information of the first terminal.

Optionally, the acknowledgment response message may be a response message fed back based on the first instruction information; the RRC connection establishment request message may be a request message before the second terminal initiates an RRC connection to the network device; the second terminal may also send the identification information of the first terminal to the network device, so that the network device releases the first network connection with the first terminal.

Optionally, after the first terminal establishes a network connection with the network device through a second terminal, the method further includes at least one of the following:

E11. sending second instruction information to the first terminal;
  optionally, the second instruction information includes at least one of the following: an instruction message for the first terminal to release the first network connection with the network device; a message that a network connection is successfully established between the second terminal and the network device; the second instruction information is used to instruct the first terminal to release a cellular network connection with the network device or notify the first terminal that the second terminal has successfully accessed a network. Here in the case that the network device includes a first base station and a second base station, second instruction information is sent by the first base station to the first terminal.

E12. receiving request information sent by the first terminal for releasing the first network connection;

optionally, after the first terminal establishes a network connection with the network device through a second terminal, if the first terminal and the network device are still connected through a first network, the first terminal may send request information to the network device for releasing the first network connection, so that the network device releases the network connection with the first terminal. Here in the case that the network device includes a first base station and a second base station, the first base station receives request information sent by the first terminal for releasing the first network connection.

E13. releasing the first network connection with the first terminal.

optionally, after the first terminal establishes a network connection with the network device through a second terminal, if the first terminal and the network device are still connected through a first network, the network device may directly release the first network connection with the first terminal.

In some embodiments, the method further includes:

establishing a RRC connection with the second terminal.

Optionally, the network device may establish a RRC connection with the second terminal after receiving a network switching request from the first terminal or the second terminal; or establish a RRC connection with the second terminal after receiving the second response information sent by the second terminal. Here in the case that the network device includes a first base station and a second base station, a second terminal establishes a RRC connection with the second base station.

Optionally, the method further includes:

acquiring first information sent by a core network device;

where the first information includes at least one of the following:

a contract relationship between the first terminal and the second terminal;

identification information of the second terminal, where the second terminal is a second terminal bound to the first terminal;

subscription information of the first terminal;

subscription information of the second terminal; or application layer configuration information of the first terminal, such as an Internet protocol (IP) address.

It should be noted that in the case that the network device is a base station, the base station acquires the first information from a core network after receiving a network switching request from the first terminal or the second terminal, or after acquiring identification information of the second terminal, or after sending the first response information to the first terminal, or after sending the first instruction information to the second terminal.

It should be noted that, in the embodiments of the present disclosure, the message transmission between the first terminal and the second terminal is achieved via the second network connection, or by using the network device to send a message from one of the terminals to the other terminal.

It should be noted that, in the embodiments of the present disclosure, identification information of a terminal may include: a user equipment identity (UE_ID), an international mobile subscriber identity (IMSI), an international mobile equipment identity (IMEI), an SIM card identity, an S-temporary mobile subscription identifier (S-TMSI), a 5G-S-TMSI, an radio network temporary identifier (RNIT), and the like.

In the embodiments of the present disclosure, in the case that the first network connection is established between a network device and a first terminal, the first terminal is instructed to make a network connection with the network device through a second terminal, thereby ensuring service continuity when a cellular network connection between a terminal and a network device is switched to a non-cellular network connection.

As shown in FIG. 2, some embodiments of the present disclosure provide a network switching method applied to a first terminal and including:

step 201: in the case that the first network connection is established between the first terminal and a network device, establish a second network connection with a second terminal, and make a network connection with the network device through the second terminal;

where the second terminal is connected to the network device through a first network.

It should be noted that the first network connection means that the first terminal or the second terminal is connected to or camps on or non-activated with a cellular network for the network device; the second network connection means a non-cellular network connection between the first terminal and the second terminal.

In the case that the first network connection is established between the first terminal and the network device, establishing a second network connection with the second terminal and establishing a network connection with the network device through the second terminal can reduce service interruptions during network switching and ensure service continuity when a cellular network connection between a terminal and a network device is switched to a non-cellular network connection.

It should be noted that, in the embodiments of the present disclosure, the network device may be a same base station, or may include two different base stations, namely a first base station and a second base station, and the first base station and the second base station can communicate. In the case that the network device is a same base station, the base station can establish the first network connection with the first terminal and the second terminal separately, and the base station can implement information interaction such as sending a request, receiving a response or receiving an instruction with the first terminal or the second terminal.

In the case that the network device includes a first base station and a second base station, the first terminal and the first base station are connected through a first network, and information interaction such as sending a request, receiving a response or receiving an instruction can be implemented between the first base station and the first terminal; the second terminal and the second base station are connected through a first network, and information interaction such as sending a request, receiving a response or receiving an instruction can be implemented between the second base station and the second terminal.

Optionally, the method further includes:

releasing, by a first terminal, the first network connection with the network device.

Optionally, before the making a network connection with the network device through a second terminal, the method further includes:

sending a first network switching request to the network device.

In some embodiments, the first network switching request includes at least one of the following:

a request message for releasing the first network connection between the first terminal and the network device;

a request message for the first terminal to perform network connection switching, where the network connection switching includes: switching the first network connection between the first terminal and the network device to a second network connection between the first terminal and the second terminal;

a message that the first terminal and the second terminal are connected through a second network;

a request message for switching a preset service from the first terminal to the second terminal;

identification information of the second terminal; or auxiliary information sent by the second terminal to the first terminal.

In some embodiments, the making a network connection with the network device through a second terminal includes:

receiving first response information sent by the network device.

Optionally, the first response information includes at least one of the following:

an acknowledgment message identification information of the second terminal;

a RRC connection release message;

instruction information for instructing the second terminal to initiate RRC connection establishment to the network device through the first terminal;

a paging message sent to the second terminal.

Optionally, the first response information is sent after the network device receives a second network switching request from the second terminal.

Optionally, the second network switching request includes at least one of the following:

a RRC connection establishment request message; and identification information of the first terminal;

a request message for releasing the first network connection between the first terminal and the network device;

a request message for the first terminal to perform network connection switching, where the network connection switching includes: switching the first network connection between the first terminal and the network device to a second network connection between the first terminal and the second terminal;

a message that the first terminal and the second terminal are connected through a second network;

a request message for switching a preset service from the first terminal to the second terminal;

identification information of the second terminal; or auxiliary information sent by the second terminal to the first terminal.

In some embodiments, after a second network connection is established between the first terminal and the second terminal, the method further includes:

receiving identification information of the second terminal sent by the second terminal.

It should be noted that after a second network connection is established between the first terminal and the second terminal, the second terminal may send identification information of the second terminal to the first terminal, and after receiving the identification information of the second terminal, the first terminal may use the identification information to send the first switching request to the network device, so that the network device establishes the first network connection with the second terminal.

In some embodiments, after a second network connection is established between the first terminal and the second terminal, the method further includes:

sending second information to the second terminal;

where the second information includes at least one of the following:

identification information of the first terminal;

application layer configuration information of the first terminal, such as an IP layer identifier and an IP address; or access layer configuration information of the first terminal, including an identifier at the access network side, such as RNTI.

It should be noted that when the first terminal triggers network connection switching, the first terminal may send the second information to the second terminal after a second network connection is established between the first terminal and the second terminal, and the second terminal may send the second information (such as identification information of the first terminal) to the network device, so that the network device releases a network connection with the first terminal.

In some embodiments, after a second network connection is established between the first terminal and the second terminal, the method further includes:

sending third information to the second terminal;

where the third information includes at least one of the following:

all or part of service information that has been established by the first terminal;

a message for releasing the first network connection between the first terminal and the network device;

a request message for the first terminal to perform network connection switching, where the network connection switching includes: switching the first network connection between the first terminal and the network device to a second network connection between the first terminal and the second terminal;

a request message for switching a preset service from the first terminal to the second terminal;

identification information of the first terminal;

application layer configuration information of the first terminal; or access layer configuration information of the first terminal.

It should be noted that after the first terminal and the second terminal establish a second network connection, the first terminal sends the third information to the second terminal, and the second terminal may send a second network switching request to the network device according to the content of the third information, or the second terminal may send second response information to the network device according to the content of the third information.

In some embodiments, after the first terminal establishes a second network connection with the second terminal and makes a network connection with the network device through the second terminal, the method further includes at least one of the following:

receiving second instruction information sent by the network device;

receiving third instruction information sent by the second terminal; or sending request information to the network device for releasing the first network connection.

Optionally, the second instruction information includes at least one of the following:
- an instruction message for the first terminal to release the first network connection with the network device; or
- a message that the second terminal and the network device successfully establish a network connection; and the third instruction information includes at least one of the following:
- an instruction message for the first terminal to release the first network connection with the network device; or
- a message that the second terminal and the network device successfully establish a network connection.

Optionally, the first network connection means that the first terminal or the second terminal is connected to or camps on or non-activated with a cellular network for the network device; and
- the second network connection means a non-cellular network connection between the first terminal and the second terminal.

It should be noted that all descriptions about a first terminal in the foregoing embodiment are applicable to the embodiment of the network switching method, and the same technical effect thereof can be achieved as well.

In the embodiment of the present disclosure, in the case of establishing the first network connection with the network device, the first terminal establishes a second network connection with the second terminal, and makes a network connection with the network device through the second terminal, which can reduce service interruptions during network switching and ensure service continuity when a cellular network connection between a terminal and a network device is switched to a non-cellular network connection.

As shown in FIG. 3, some embodiments of the present disclosure provide a network switching method applied to a second terminal and including:
- step 301: in the case that the first network connection is established between a first terminal and a network device, establish a second network connection with the first terminal, and establish the first network connection with the network device.

In the case that the first network connection is established between the first terminal and the network device, the second terminal establishes a second network connection with the first terminal and establishes the first network connection with the network device, which can reduce service interruptions during network switching and ensure service continuity when a cellular network connection between a terminal and a network device is switched to a non-cellular network connection.

It should be noted that, in the embodiments of the present disclosure, the network device may be a same base station, or may include two different base stations, namely a first base station and a second base station, and the first base station and the second base station can communicate. In the case that the network device is a same base station, the base station can establish the first network connection with the first terminal and the second terminal separately, and the base station can implement information interaction such as sending a request, receiving a response or receiving an instruction with the first terminal or the second terminal.

In the case that the network device includes a first base station and a second base station, the first terminal and the first base station are connected through a first network, and information interaction such as sending a request, receiving a response or receiving an instruction can be implemented between the first base station and the first terminal; the second terminal and the second base station are connected through a first network, and information interaction such as sending a request, receiving a response or receiving an instruction can be implemented between the second base station and the second terminal.

In some embodiments, before the establishing a second network connection with the first terminal, and establishing the first network connection with the network device, the method further includes:
- sending a second network switching request to the network device.

Optionally, the second network switching request includes at least one of the following:
- a RRC connection establishment request message; and identification information of the first terminal;
- a request message for releasing the first network connection between the first terminal and the network device;
- a request message for the first terminal to perform network connection switching, where the network connection switching includes: switching the first network connection between the first terminal and the network device to a second network connection between the first terminal and the second terminal;
- a message that the first terminal and the second terminal are connected through a second network;
- a request message for switching a preset service from the first terminal to the second terminal;
- identification information of the second terminal; or
- auxiliary information sent by the second terminal to the first terminal.

In some embodiments, the establishing the first network connection with the network device includes:
- receiving first instruction information sent by the network device.

Optionally, the first instruction information includes at least one of the following:
- an acknowledgment message
- a paging message sent to the second terminal;
- identification information of the first terminal;
- instruction information for releasing the first network connection between the first terminal and the network device;
- instruction information for the first terminal to perform network connection switching, where the network connection switching includes: switching the first network connection between the first terminal and the network device to a second network connection between the first terminal and the second terminal;
- instruction information for the first terminal and the second terminal to connect through a second network; and
- a request message for switching a preset service from the first terminal to the second terminal.

Optionally, the first instruction information is sent after the network device receives a first network switching request from the first terminal.

Optionally, the first network switching request includes at least one of the following:
- a request message for releasing the first network connection between the first terminal and the network device;
- a request message for the first terminal to perform network connection switching, where the network connection switching includes: switching the first network connection between the first terminal and the network device to a second network connection between the first terminal and the second terminal;

a message that the first terminal and the second terminal are connected through a second network;
a request message for switching a preset service from the first terminal to the second terminal;
identification information of the second terminal; or
auxiliary information sent by the second terminal to the first terminal.

In some embodiments, the establishing the first network connection with the network device includes:
sending second response information to the network device.

Optionally, the second response information includes at least one of the following:
an acknowledgment response message;
a RRC connection establishment request message; or
identification information of the first terminal.

In some embodiments, after a second network connection is established between the second terminal and the first terminal, the method further includes:
sending identification information of the second terminal to the first terminal.

In some embodiments, after a second network connection is established between the second terminal and the first terminal, the method further includes:
receiving second information sent by the first terminal;
where the second information includes at least one of the following:
identification information of the first terminal;
application layer configuration information of the first terminal; or
access layer configuration information of the first terminal.

In some embodiments, after a second network connection is established between the second terminal and the first terminal, the method further includes:
receiving third information sent by the first terminal;
where the third information includes at least one of the following:
all or part of service information that has been established by the first terminal;
a message for releasing the first network connection between the first terminal and the network device;
a request message for the first terminal to perform network connection switching, where the network connection switching includes: switching the first network connection between the first terminal and the network device to a second network connection between the first terminal and the second terminal;
a request message for switching a preset service from the first terminal to the second terminal;
identification information of the first terminal;
application layer configuration information of the first terminal; or
access layer configuration information of the first terminal.

In some embodiments, after the second terminal establishes a second network connection with the first terminal and establishes the first network connection with the network device, the method further includes:
sending third instruction information to the first terminal;
the third instruction information includes at least one of the following:
an instruction message for the first terminal to release the first network connection with the network device; or
a message that the second terminal and the network device successfully establish a network connection.

In some embodiments, the method further includes:
initiating RRC connection establishment to the network device.

Optionally, the first network connection means that the first terminal or the second terminal is connected to or camps on or non-activated with a cellular network for the network device; and
the second network connection means a non-cellular network connection between the first terminal and the second terminal.

It should be noted that all descriptions about a second terminal in the foregoing embodiment are applicable to the embodiment of the network switching method, and the same technical effect thereof can be achieved as well.

In the embodiments of the present disclosure, in the case that the first network connection is established between the first terminal and the network device, establishing a second network connection with the first terminal and establishing the first network connection with the network device can reduce service interruptions during network switching and ensure service continuity when a cellular network connection between a terminal and a network device is switched to a non-cellular network connection.

Figure 4:
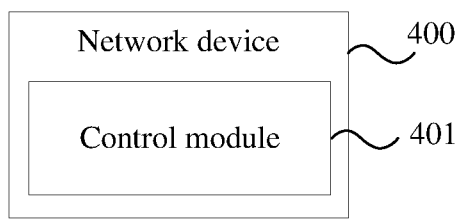
FIG. 4 illustrates a schematic diagram of a module of a network device according to some embodiments of the present disclosure.

As shown in FIG. 4, some embodiments of the present disclosure provide a network device 400 including:
a control module 401, configured to instruct, in the case that the first network connection is established between the network device and a first terminal, the first terminal to make a network connection with the network device through a second terminal;
where the first terminal is connected to the second terminal through a second network, and the second terminal is connected to the network device through a first network.

Optionally, the network device 400 further includes:
a first network release module, configured to release the first network connection with the first terminal.

Optionally, the network device 400 further includes:
a first receiving module, configured to receive a first network switching request sent by the first terminal; or
receiving a second network switching request sent by the second terminal.

Optionally, the first network switching request includes at least one of the following:
a request message for releasing the first network connection between the first terminal and the network device;
a request message for the first terminal to perform network connection switching, where the network connection switching includes: switching the first network connection between the first terminal and the network device to a second network connection between the first terminal and the second terminal;
a message that the first terminal and the second terminal are connected through a second network;
a request message for switching a preset service from the first terminal to the second terminal;
identification information of the second terminal; or
auxiliary information sent by the second terminal to the first terminal.

Optionally, the second network switching request includes at least one of the following:
a RRC connection establishment request message; and
identification information of the first terminal;
a request message for releasing the first network connection between the first terminal and the network device;
a request message for the first terminal to perform network connection switching, where the network connection switching includes: switching the first network connection between the first terminal and the network device to a second network connection between the first terminal and the second terminal;
a message that the first terminal and the second terminal are connected through a second network;
a request message for switching a preset service from the first terminal to the second terminal;
identification information of the second terminal; or
auxiliary information sent by the second terminal to the first terminal.

Optionally, the control module 401 is configured for:
sending first response information to the first terminal.

Optionally, the first response information includes at least one of the following:
an acknowledgment message
identification information of the second terminal;
a RRC connection release message;
instruction information for instructing the second terminal to initiate RRC connection establishment to the network device through the first terminal; or
a paging message sent to the second terminal.

Optionally, the control module 401 is configured for:
sending first instruction information to the second terminal.

Optionally, the first instruction information includes at least one of the following:
an acknowledgment message;
a paging message sent to the second terminal;
identification information of the first terminal;
instruction information for releasing the first network connection between the first terminal and the network device;
instruction information for the first terminal to perform network connection switching, where the network connection switching includes: switching the first network connection between the first terminal and the network device to a second network connection between the first terminal and the second terminal;
instruction information for the first terminal and the second terminal to connect through a second network; or
a request message for switching a preset service from the first terminal to the second terminal.

Optionally, the control module 401 is configured for:
receiving second response information sent by the second terminal.

Optionally, the second response information includes at least one of the following:
an acknowledgment response message;
a RRC connection establishment request message; or
identification information of the first terminal.

Optionally, the network device 400 further includes at least one of the following:
a first sending module, configured to send second instruction information to the first terminal;
a second receiving module, configured to receive request information for releasing the first network connection sent by the first terminal; or
a second network release module, configured to release the first network connection with the first terminal.

Optionally, the network device 400 further includes:
a first RRC connection module, configured to establish a RRC connection with the second terminal.

Optionally, the network device 400 further includes:
a first acquisition module, configured to acquire first information sent by a core network device;

where the first information includes at least one of the following:
a contract relationship between the first terminal and the second terminal;
identification information of the second terminal;
subscription information of the first terminal;
subscription information of the second terminal; or
application layer configuration information of the first terminal.

Optionally, the first network connection means that the first terminal or the second terminal is connected to or camps on or non-activated with a cellular network for the network device; and
the second network connection means a non-cellular network connection between the first terminal and the second terminal.

It should be noted that this network device embodiment provides a network device corresponding to the foregoing network switching method applied to the network device, all implementations in the foregoing embodiments are applicable to this network device embodiment, and the same technical effect thereof can be achieved.

Some embodiments of the present disclosure further provide a network device, including a memory, a processor and a computer program that is stored in a memory and executable on a processor. When executed by the processor, the computer program implement each process of the foregoing network switching method embodiment applied to a network-side device, and the same technical effect can be achieved. To avoid repetition, details are not described herein.

Figure 5:
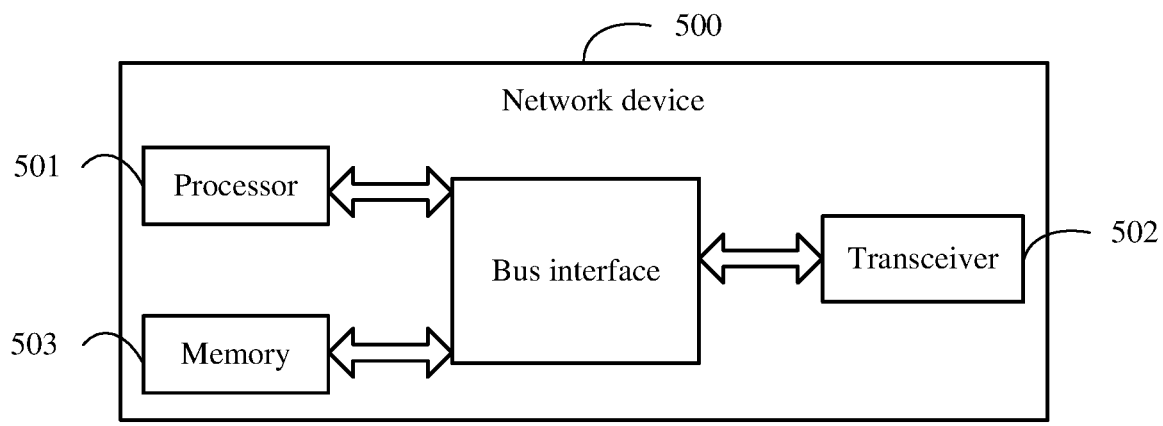
FIG. 5 illustrates a structural block diagram of a network device according to some embodiments of the present disclosure.

FIG. 5 is a structural diagram of a network device according to an embodiment of the present disclosure, which can implement details of the foregoing network switching method and achieve the same effect. As shown in FIG. 5, a network device 500 includes: a processor 501, a transceiver 502, a memory 503, and a bus interface.

The processor 501 is configured to read a program in the memory 503 and perform the following process:
in the case that the first network connection is established between the network device and a first terminal, instructing the first terminal to make a network connection with the network device through a second terminal;
where the first terminal is connected to the second terminal through a second network, and the second terminal is connected to the network device through a first network.

In FIG. 5, a bus architecture may include any quantity of interconnected buses and bridges, which may be connected together by various circuits of one or more processors represented by the processor 501 and a memory represented by the memory 503. The bus architecture may further connect together various other circuits of a peripheral device, a voltage stabilizer, a power management circuit, and the like, which are known in this art and will not be further described herein. The bus interface provides an interface. The transceiver 502 may include a plurality of elements, namely a transmitter and a receiver, and provides units for communication with various other apparatuses on a transmission medium.

Optionally, the processor 501 is configured to read a program in the memory 503 to perform the following processes:
releasing the first network connection with the first terminal.

Optionally, the processor 501 is configured to read a program in the memory 503 to perform the following processes:
receiving a first network switching request sent by the first terminal; or
receiving a second network switching request sent by the second terminal.

Optionally, the first network switching request includes at least one of the following:
a request message for releasing the first network connection between the first terminal and the network device;
a request message for the first terminal to perform network connection switching, where the network connection switching includes: switching the first network connection between the first terminal and the network device to a second network connection between the first terminal and the second terminal;
a message that the first terminal and the second terminal are connected through a second network;
a request message for switching a preset service from the first terminal to the second terminal;
identification information of the second terminal; or
auxiliary information sent by the second terminal to the first terminal.

Optionally, the second network switching request includes at least one of the following:
a RRC connection establishment request message; and identification information of the first terminal;
a request message for releasing the first network connection between the first terminal and the network device;
a request message for the first terminal to perform network connection switching, where the network connection switching includes: switching the first network connection between the first terminal and the network device to a second network connection between the first terminal and the second terminal;
a message that the first terminal and the second terminal are connected through a second network;
a request message for switching a preset service from the first terminal to the second terminal;
identification information of the second terminal; or
auxiliary information sent by the second terminal to the first terminal.

Optionally, the processor 501 is configured to read a program in the memory 503 to perform the following processes:
sending first response information to the first terminal.

Optionally, the first response information includes at least one of the following:
an acknowledgment message
identification information of the second terminal;
a RRC connection release message;
instruction information for instructing the second terminal to initiate RRC connection establishment to the network device through the first terminal; or
a paging message sent to the second terminal.

Optionally, the processor 501 is configured to read a program in the memory 503 to perform the following processes:
sending first instruction information to the second terminal.

Optionally, the first instruction information includes at least one of the following:
an acknowledgment message
a paging message sent to the second terminal;
identification information of the first terminal;
instruction information for releasing the first network connection between the first terminal and the network device;
instruction information for the first terminal to perform network connection switching, where the network connection switching includes: switching the first network connection between the first terminal and the network device to a second network connection between the first terminal and the second terminal;
instruction information for the first terminal and the second terminal to connect through a second network; or
a request message for switching a preset service from the first terminal to the second terminal.

Optionally, the processor 501 is configured to read a program in the memory 503 to perform the following processes:
receiving second response information sent by the second terminal.

Optionally, the second response information includes at least one of the following:
an acknowledgment response message;
a RRC connection establishment request message; or
identification information of the first terminal.

Optionally, the processor 501 is configured to read a program in the memory 503 to perform the following processes:
sending second instruction information to the first terminal;
receiving request information sent by the first terminal for releasing the first network connection;
releasing the first network connection with the first terminal.

Optionally, the processor 501 is configured to read a program in the memory 503 to perform the following processes:
establishing a RRC connection with the second terminal.

Optionally, the processor 501 is configured to read a program in the memory 503 to
perform the following processes:
acquiring first information sent by a core network device; where the first information includes at least one of the following:
a contract relationship between the first terminal and the second terminal;
identification information of the second terminal;
subscription information of the first terminal;
subscription information of the second terminal; or
application layer configuration information of the first terminal.

Optionally, the first network connection means that the first terminal or the second terminal is connected to or camps on or non-activated with a cellular network for the network device; and
the second network connection means a non-cellular network connection between the first terminal and the second terminal.

The network device may be a base transceiver station (BTS) in a global system for mobile communications (GSM) or code division multiple access (CDMA), or may be a NodeB (NB) in wideband code division multiple access (WCDMA), or may be an evolved Node B (eNB or eNodeB), or a relay station or an access point in LTE, or a base station in a future 5G network, or the like, which is not limited herein.

Some embodiments of the present disclosure further provide a non-transitory computer-readable storage medium with a computer program stored thereon. When executed by the processor, the computer program implement each process of the embodiment of the network switching method applied to the network device and the same technical effect can be achieved. To avoid repetition, details are not described herein again. The non-transitory computer-readable storage medium is, for example, a read-only memory (ROM), a random access memory (RAM), a magnetic disk or an optical disk.

Figure 6:
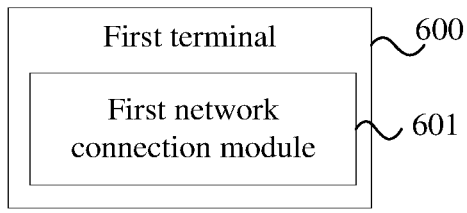
FIG. 6 illustrates a schematic diagram of a module of a first terminal according to some embodiments of the present disclosure.

As shown in FIG. 6, some embodiments of the present disclosure provide a terminal, where the terminal is a first terminal 600 and includes:

the first network connection module 601, configured to establish, in the case that the first network connection is established between the first terminal and a network device, a second network connection with a second terminal, and make a network connection with the network device through the second terminal;

where the second terminal is connected to the network device through a first network.

Optionally, the terminal further includes:

a third network release module, configured for a first terminal to release the first network connection with the network device.

Optionally, the terminal further includes:

a second sending module, configured to send a first network switching request to the network device.

Optionally, the first network switching request includes at least one of the following:

a request message for releasing the first network connection between the first terminal and the network device;

a request message for the first terminal to perform network connection switching, where the network connection switching includes: switching the first network connection between the first terminal and the network device to a second network connection between the first terminal and the second terminal;

a message that the first terminal and the second terminal are connected through a second network;

a request message for switching a preset service from the first terminal to the second terminal;

identification information of the second terminal; or auxiliary information sent by the second terminal to the first terminal.

Optionally, the first network connection module 601 is configured for:

receiving first response information sent by the network device.

Optionally, the first response information includes at least one of the following:

an acknowledgment message identification information of the second terminal;

a RRC connection release message;

instruction information for instructing the second terminal to initiate RRC connection establishment to the network device through the first terminal; or a paging message sent to the second terminal.

Optionally, the first response information is sent after the network device receives a second network switching request from the second terminal.

Optionally, the second network switching request includes at least one of the following:

a RRC connection establishment request message; and identification information of the first terminal;

a request message for releasing the first network connection between the first terminal and the network device;

a request message for the first terminal to perform network connection switching, where the network connection switching includes: switching the first network connection between the first terminal and the network device to a second network connection between the first terminal and the second terminal;

a message that the first terminal and the second terminal are connected through a second network;

a request message for switching a preset service from the first terminal to the second terminal;

identification information of the second terminal; or auxiliary information sent by the second terminal to the first terminal.

Optionally, the terminal further includes:

a third receiving module, configured to receive identification information of the second terminal sent by the second terminal.

Optionally, the terminal further includes:

a third sending module, configured to send second information to the second terminal;

where the second information includes at least one of the following:

identification information of the first terminal;

application layer configuration information of the first terminal; or access layer configuration information of the first terminal.

Optionally, the terminal further includes:

a fourth sending module, configured to send third information to the second terminal;

where the third information includes at least one of the following:

all or part of service information that has been established by the first terminal;

a message for releasing the first network connection between the first terminal and the network device;

a request message for the first terminal to perform network connection switching, where the network connection switching includes: switching the first network connection between the first terminal and the network device to a second network connection between the first terminal and the second terminal;

a request message for switching a preset service from the first terminal to the second terminal;

identification information of the first terminal;

application layer configuration information of the first terminal; or access layer configuration information of the first terminal.

Optionally, the terminal further includes at least one of the following:

a fourth receiving module, configured to receive second instruction information sent by the network device;

a fifth receiving module, configured to receive third instruction information sent by the second terminal; or a fifth sending module, configured to send request information to the network device for releasing the first network connection.

Optionally, the second instruction information includes at least one of the following:

an instruction message for the first terminal to release the first network connection with the network device;

a message that the second terminal and the network device successfully establish a network connection; or the third instruction information includes at least one of the following:

an instruction message for the first terminal to release the first network connection with the network device;

a message that the second terminal and the network device successfully establish a network connection.

Optionally, the first network connection means that the first terminal or the second terminal is connected to or camps on or non-activated with a cellular network for the network device; and the second network connection means a non-cellular network connection between the first terminal and the second terminal.

It should be noted that this terminal embodiment provides a terminal corresponding to the foregoing network switching method applied to a first terminal, all implementations in the foregoing embodiments are applicable to this terminal embodiment and the same technical effect thereof can be achieved.

Figure 7:
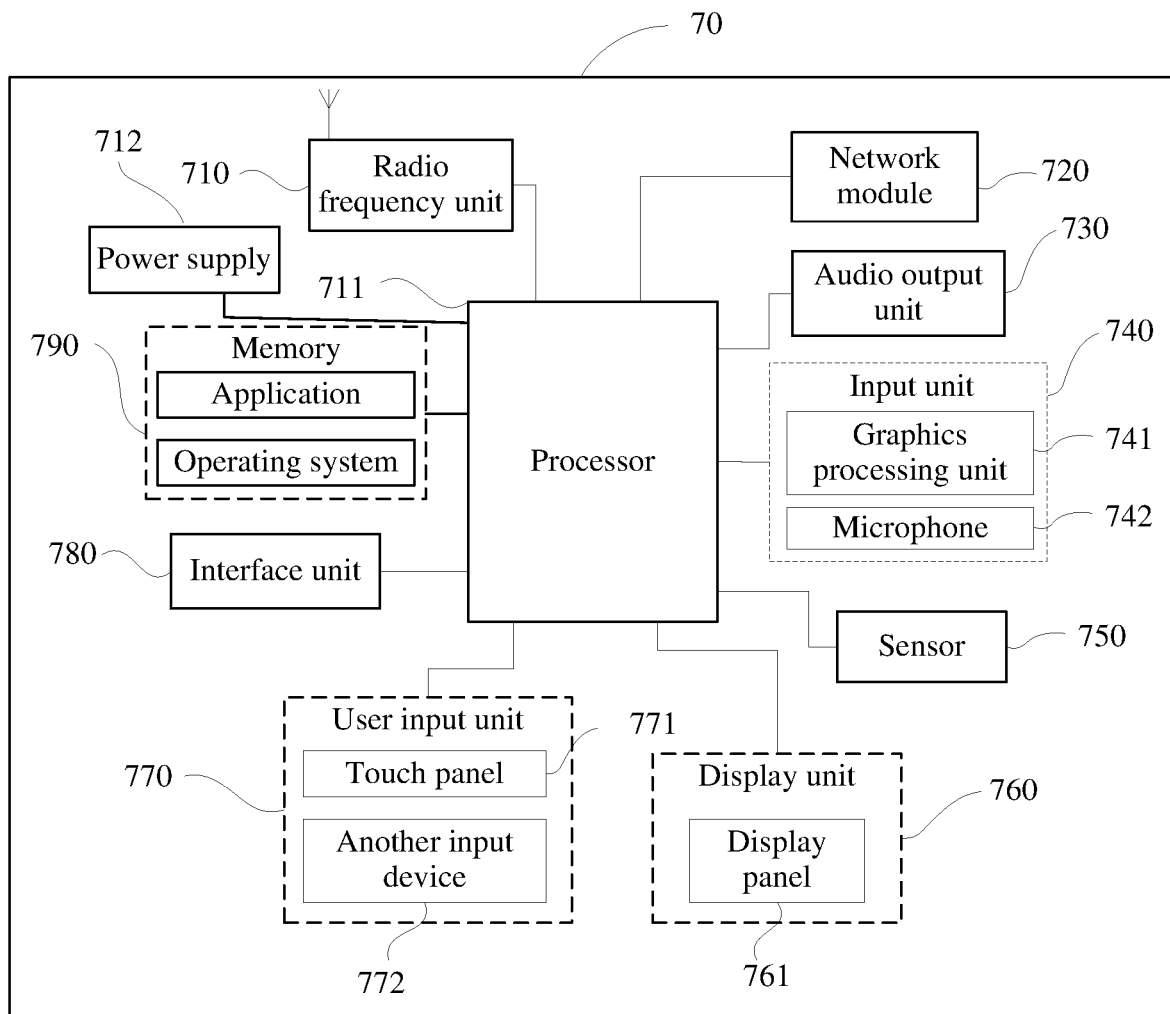
FIG. 7 illustrates a structural block diagram of a first terminal according to some embodiments of the present disclosure.

FIG. 7 is a schematic diagram of a hardware structure of a terminal implementing some embodiments of the present disclosure, where the terminal is a first terminal.

The terminal 70 includes but is not limited to components such as a radio frequency unit 710, a network module 720, an audio output unit 730, an input unit 740, a sensor 750, a display unit 760, a user input unit 770, an interface unit 780, a memory 790, a processor 711, and a power supply 712. Those skilled in the art may understand that the terminal structure shown in FIG. 7 does not constitute a limitation on the terminal. The terminal may include more or fewer components than those shown in the figure, or some components may be combined, or there may be a different component arrangement. In some embodiments of the present disclosure, the terminal includes but is not limited to a mobile phone, a tablet computer, a notebook computer, a palmtop computer, an in-vehicle terminal, a wearable device, a pedometer, and the like.

The processor 711 is configured to establish, in the case that the first network connection is established between the first terminal and a network device, a second network connection with a second terminal, and make a network connection with the network device through the second terminal; where the second terminal is connected to the network device through a first network.

It should be understood that in some embodiments of the present disclosure, the radio frequency unit 710 may be configured to receive and send information or a signal in a call process. For example, the radio frequency unit 710 is configured to receive downlink data from a network-side device and give it to the processor 711 for processing; and additionally send uplink data to the network-side device. Generally, the radio frequency unit 710 includes, but is not limited to, an antenna, at least one amplifier, a transceiver, a coupler, a low noise amplifier, a duplexer, and the like. In addition, the radio frequency unit 710 may also communicate with another device through a wireless communications system and network.

The terminal provides a user with wireless broadband Internet access by using the network module 720, for example, helping the user receive and send an email, browse a web page, and access streaming media.

The audio output unit 730 may convert audio data received by the radio frequency unit 710 or the network module 720 or stored in the memory 790 into an audio signal and output the audio signal as a sound. In addition, the audio output unit 730 may further provide audio output (such as a call signal reception sound, a message reception sound) related to a specific function performed by the first terminal 70. The audio output unit 730 includes a speaker, a buzzer, a telephone receiver, and the like.

The input unit 740 is configured to receive an audio signal or a video signal. The input unit 740 may include a graphics processing unit (GPU) 741 and a microphone 742. The graphics processing unit 741 processes image data of a static image or a video obtained by an image capture apparatus (such as, a camera) in a video capture mode or an image capture mode. A processed image frame may be displayed on the display unit 760. The image frame processed by the graphics processing unit 741 may be stored in the memory 790 (or another storage medium) or sent by using the radio frequency unit 710 or the network module 720. The microphone 742 may receive sound and can process such sound into audio data. The processed audio data may be output by being converted into a format that may be sent to a mobile communications network-side device by using the radio frequency unit 710 in a telephone call mode.

The first terminal 70 further includes at least one sensor 750, such as a light sensor, a motion sensor, and another sensor. The light sensor includes an ambient light sensor and a proximity sensor, where the ambient light sensor can adjust brightness of a display panel 761 based on brightness of ambient light, and the proximity sensor can turn off the display panel 761 and/or backlight when the first terminal 70 is moved towards the ear. As a type of motion sensor, an accelerometer sensor may detect an acceleration value in each direction (generally, three axes), and detect a value and a direction of gravity when the accelerometer sensor is static, and may be configured to recognize a terminal posture (for example, screen switching between landscape and portrait modes, a related game, or magnetometer posture calibration), and perform a function related to vibration recognition (for example, a pedometer or a knock), and the like. The sensor 750 may further include a fingerprint sensor, a pressure sensor, an iris sensor, a molecular sensor, a gyroscope, a barometer, a hygrometer, a thermometer, an infrared sensor, and the like. Details are not described herein again.

The display unit 760 is configured to display information entered by a user or information provided for the user. The display unit 760 may include a display panel 761, and the display panel 761 may be configured in a form of a liquid crystal display (LCD), an organic light-emitting diode (OLED), or the like.

The user input unit 770 can be configured to receive input numeric or character information, and generate key signal inputs related to user settings and function control of the terminal. The user input unit 770 includes a touch panel 771 and another input device 772. The touch panel 771, also called a touch screen, can collect a touch operation of the user on or near the touch panel 771 (For example, the user uses any suitable object or accessory such as a finger or a stylus to operate on or near the touch panel 771). The touch panel 771 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, sends the touch point coordinates to a processor 711, and receives and executes a command sent by the processor 711. In addition, the touch panel 771 may be implemented by using a plurality of types such as a resistive type, a capacitive type, an infrared ray, and a surface acoustic wave. In addition to the touch panel 771, the user input unit 770 may also include the another input device 772. The another input device 772 may include, but is not limited to, a physical keyboard, functional keys (for example, a volume control key and a switch key), a trackball, a mouse, and a joystick. Details are not described herein again.

Optionally, the touch panel 771 may cover the display panel 761. When the touch panel 771 detects a touch operation on or near the touch panel 771, the touch operation is transmitted to the processor 711 to determine a type of a touch event, and then the processor 711 provides corresponding visual output on the display panel 761 according to the type of the touch event. Although in FIG. 7, the touch panel 771 and the display panel 761 are two independent components for implementing input and output functions of the terminal, in some embodiments, the touch panel 771 and the display panel 761 may be integrated to implement the input and output functions of the terminal. Details are not limited herein.

The interface unit 780 is an interface for connecting an external device and the first terminal 70. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, a headset jack, and the like. The interface unit 780 may be configured to receive input (for example, data information and power) from the external apparatus and transmit the received input to one or more elements in the first terminal 70, or may be configured to transmit data between the first terminal 70 and the external apparatus.

The memory 790 may be configured to store a software program as well as various data. The memory 790 may mainly include a program storage area and a data storage area. The program storage area may store an operating system, an application program required by at least one function (such as a sound playback function and an image display function), and the like. The data storage area may store data (such as audio data and a phone book) created based on use of the mobile phone, and the like. In addition, the memory 740 may include a high-speed random access memory or a nonvolatile memory, for example, at least one disk storage device, a flash memory, or another volatile solid-state storage device.

The processor 711 is a control center of the terminal. The processor 711 uses various interfaces and lines to connect the various parts of the entire terminal, and performs various functions of the terminal and processes data by running or executing software programs and/or modules stored in the memory 790 and invoking data stored in the memory 790, to monitor the terminal as a whole. The processor 711 may include one or more processing units. Optionally, the processor 711 may be integrated with an application processor and a modem processor. The application processor mainly processes an operating system, a user interface, an application program, and the like. The modem processor mainly processes wireless communications. It may be understood that alternatively, the modem processor may not be integrated into the processor 711.

The first terminal 70 may further include a power supply 712 (for example, a battery) that supplies power to various components. Optionally, the power supply 712 may be logically connected to the processor 711 through a power supply management system, to perform functions of managing charging, discharging, and power consumption through the power supply management system.

In addition, the first terminal 70 includes some functional modules that are not shown. Details are not described herein.

It should also be noted that the processor 711 is further configured to implement another process in the network switching method applied to a first terminal in the foregoing embodiment. Details are not described herein.

Optionally, some embodiments of the present disclosure further provide a terminal, where the terminal is a first terminal and includes a processor 711, a memory 790, and a computer program that is stored in the memory 790 and executable on the processor 711. When executed by the processor 711, the computer program implements each process of the network switching embodiment applied to a first terminal, and the same technical effect can be achieved. To avoid repetition, details are not described herein again.

Some embodiments of the present disclosure further provide a non-transitory computer-readable storage medium with a computer program stored thereon. When executed by the processor, the computer program implements each process of the embodiment of the network switching method applied to a first terminal, and the same technical effect can be achieved. To avoid repetition, details are not described herein again. The non-transitory computer-readable storage medium is, for example, a read-only memory (ROM), a random access memory (RAM), a magnetic disk or an optical disk.

Figure 8:
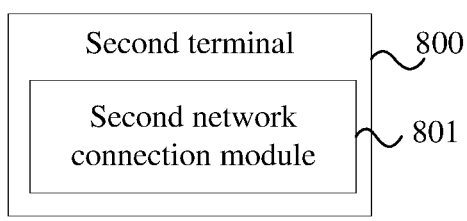
FIG. 8 illustrates a schematic diagram of a module of a second terminal according to some embodiments of the present disclosure.

As shown in FIG. 8, some embodiments of the present disclosure provide a terminal, where the terminal is a second terminal 800 and includes:
  a second network connection module 801, configured to establish, in the case that the first network connection is established between a first terminal and a network device, a second network connection with the first terminal and establish the first network connection with the network device.

Optionally, the terminal further includes:
  a sixth sending module, configured to send a second network switching request to the network device.

Optionally, the second network switching request includes at least one of the following:
  a RRC connection establishment request message;
  identification information of the first terminal;
  a request message for releasing the first network connection between the first terminal and the network device;
  a request message for the first terminal to perform network connection switching, where the network connection switching includes: switching the first network connection between the first terminal and the network device to a second network connection between the first terminal and the second terminal;
  a message that the first terminal and the second terminal are connected through a second network;
  a request message for switching a preset service from the first terminal to the second terminal;
  identification information of the second terminal; or
  auxiliary information sent by the second terminal to the first terminal.

Optionally, the second network connection module 801 is configured for:
  receiving first instruction information sent by the network device.

Optionally, the first instruction information includes at least one of the following:
  an acknowledgment message;
  a paging message sent to the second terminal;
  identification information of the first terminal;
  instruction information for releasing the first network connection between the first terminal and the network device;

instruction information for the first terminal to perform network connection switching, where the network connection switching includes: switching the first network connection between the first terminal and the network device to a second network connection between the first terminal and the second terminal;
instruction information for the first terminal and the second terminal to connect through a second network; or
a request message for switching a preset service from the first terminal to the second terminal.

Optionally, the first instruction information is sent after the network device receives a first network switching request from the first terminal.

Optionally, the first network switching request includes at least one of the following:
a request message for releasing the first network connection between the first terminal and the network device;
a request message for the first terminal to perform network connection switching, where the network connection switching includes: switching the first network connection between the first terminal and the network device to a second network connection between the first terminal and the second terminal;
a message that the first terminal and the second terminal are connected through a second network;
a request message for switching a preset service from the first terminal to the second terminal;
identification information of the second terminal; or
auxiliary information sent by the second terminal to the first terminal.

Optionally, the second network connection module 801 is configured for:
sending second response information to the network device.

Optionally, the second response information includes at least one of the following:
an acknowledgment response message;
a RRC connection establishment request message; or
identification information of the first terminal.

Optionally, the terminal further includes:
a seventh sending module, configured to send identification information of the second terminal to the first terminal.

Optionally, the terminal further includes:
a sixth receiving module, configured to receive second information sent by the first terminal:
where the second information includes at least one of the following:
identification information of the first terminal;
application layer configuration information of the first terminal; or
access layer configuration information of the first terminal.

Optionally, the terminal further includes:
an eighth receiving module, configured to receive third information sent by the first terminal;
where the third information includes at least one of the following:
all or part of service information that has been established by the first terminal;
a message for releasing the first network connection between the first terminal and the network device;
a request message for the first terminal to perform network connection switching, where the network connection switching includes: switching the first network connection between the first terminal and the network device to a second network connection between the first terminal and the second terminal;
a request message for switching a preset service from the first terminal to the second terminal;
identification information of the first terminal;
application layer configuration information of the first terminal; or
access layer configuration information of the first terminal.

Optionally, the terminal further includes:
a ninth sending module, configured to send third instruction information to the first terminal
the third instruction information includes at least one of the following:
an instruction message for the first terminal to release the first network connection with the network device; or
a message that the second terminal and the network device successfully establish a network connection.

Optionally, the terminal further includes:
a second RRC connection module, configured to initiate RRC connection establishment to the network device.

Optionally, the first network connection means that the first terminal or the second terminal is connected to or camps on or non-activated with a cellular network for the network device; and
the second network connection means a non-cellular network connection between the first terminal and the second terminal.

It should be noted that this terminal embodiment provides a terminal corresponding to the foregoing network switching method applied to a second terminal, all implementations in the foregoing embodiments are applicable to this terminal embodiment and the same technical effect thereof can be achieved.

It should also be noted that some embodiments of the present disclosure further provide a terminal, where the terminal is a second terminal, and a structure of the second terminal may be the same as that of the first terminal shown in FIG. 7.

Optionally, the processor of the second terminal is configured to establish, in the case that the first network connection is established between a first terminal and a network device, a second network connection with the first terminal and establish the first network connection with the network device.

It should also be noted that the processor of the second terminal is further configured to implement another process in the network switching method applied to a second terminal in the foregoing embodiment. Details are not described herein.

Optionally, some embodiments of the present disclosure further provide a terminal, where the terminal is a second terminal and includes a processor, a memory, and a computer program that is stored in a memory and executable on a processor. When executed by the processor, the computer program implements each process of the embodiment of the network switching method applied to a second terminal, and the same technical effect can be achieved. To avoid repetition, details are not described herein.

Some embodiments of the present disclosure further provide a non-transitory computer-readable storage medium with a computer program stored thereon. When executed by the processor, the computer program implements each process of the embodiment of the network switching method applied to a second terminal, and the same technical effect can be achieved. To avoid repetition, details are not described herein again. The non-transitory computer-readable storage medium is, for example, a read-only memory (ROM), a random access memory (RAM), a magnetic disk or an optical disk.

It should be noted that the terms "include", "comprise" or any other variants thereof herein are intended to cover a non-exclusive inclusion, so that a process, a method, an article or equipment that includes a list of elements not only includes those elements, and further includes another element not expressly listed, or an element inherent to such a process, a method, an article, or equipment. Without being subject to further limitations, an element defined by a phrase "including a . . . " does not exclude presence of other identical elements in the process, method, article, or apparatus that includes the very element.

By means of the foregoing description of the embodiments, a person skilled in the art may clearly understand that the method in the foregoing embodiments may be implemented by software with a necessary general hardware platform. Certainly, the method in the foregoing embodiments may also be implemented by hardware. However, in many cases, the former is a preferred embodiment. Based on such an understanding, the technical solutions of the present disclosure essentially or the part contributing to the prior art may be implemented in a form of a software product. The computer software product is stored in a storage medium (such as a ROM/RAM, a magnetic disk, or an optical disc), and includes several instructions for instructing a terminal (which may be a mobile phone, a computer, a server, an air conditioner, a network side device, or the like) to perform the methods described in the embodiments of the present disclosure.

It may be understood that the embodiments described in some embodiments of the present disclosure may be implemented by hardware, software, firmware, middleware, microcode, or a combination thereof. For hardware implementation, a module, a unit, a submodule, a subunit, or the like may be implemented in one or more application specific integrated circuits (ASIC), a digital signal processor (DSP), a digital signal processing device (DSPD), a programmable logic device (PLD), a field-programmable gate array (FPGA), a general purpose processor, a controller, a microcontroller, a microprocessor, another electronic unit configured to perform the functions described in this application, or a combination thereof.

For implementation with software, the technology described in some embodiments of the present disclosure may be implemented by executing functional modules (for example, a process and a function) described in some embodiments of the present disclosure. Software codes may be stored in the memory and executed by the processor. The memory may be implemented in the processor or outside the processor.

Therefore, the objective of the present disclosure may also be achieved by running a program or a set of programs on any computing apparatus. The computing apparatus may be a well-known general-purpose apparatus. Therefore, the objective of this disclosure may also be achieved only by providing a program product including program code for implementing the method or the apparatus. In other words, such a program product also constitutes this disclosure, and a storage medium storing such a program product also constitutes this disclosure. Obviously, the storage medium may be any well-known storage medium or any storage medium to be developed in the future. It should be further noted that in the apparatuses and methods of the present disclosure, it is obvious that the components or the steps may be divided and/or recombined. These divisions and/or recombinations should be considered as equivalent solutions of the present disclosure. Moreover, the steps for performing the foregoing series of processing may be performed naturally in chronological order according to a described sequence, but do not necessarily need to be performed in chronological order, and some steps may be performed in parallel or independently.

The optional implementations of this disclosure are described above. It should be noted that persons of ordinary skill in the technical field may further make several improvements and refinements without departing from the principles described in this disclosure, and these improvements and refinements also fall within the protection scope of this disclosure.

What is claimed is:

1. A network switching method, applied to a network device and comprising:
    responsive to a first network connection being established between the network device and a first terminal, instructing the first terminal to make a network connection with the network device through a second terminal; wherein
    the first terminal is connected to the second terminal through a second network, and the second terminal is connected to the network device through the first network; wherein
    before the instructing the first terminal to make a network connection with the network device through a second terminal, the method further comprises:
    receiving a second network switching request sent by the second terminal; wherein
    the second network switching request comprises at least one of:
    a radio resource control (RRC) connection establishment request message; or
    identification information of the first terminal.

2. The network switching method according to claim 1, further comprising:
    releasing the first network connection with the first terminal.

3. The network switching method according to claim 1, wherein
    the second network switching request further comprises at least one of:
    a request message for releasing the first network connection between the first terminal and the network device;
    a request message for the first terminal to perform network connection switching, wherein the network connection switching comprises: switching the first network connection between the first terminal and the network device to a second network connection between the first terminal and the second terminal;
    a message that the first terminal and the second terminal are connected through a second network;
    a request message for switching a preset service from the first terminal to the second terminal;
    identification information of the second terminal; or
    auxiliary information sent by the second terminal to the first terminal.

4. The network switching method according to claim 1, wherein the instructing the first terminal to make a network connection with the network device through a second terminal comprises:
    sending first response information to the first terminal.

5. The network switching method according to claim 4, wherein the first response information comprises at least one of:

an acknowledgment message;
identification information of the second terminal;
a radio resource control (RRC) connection release message;
instruction information for instructing the second terminal to initiate RRC connection establishment to the network device through the first terminal; or
a paging message sent to the second terminal.

6. The network switching method according to claim 1, wherein the instructing the first terminal to make a network connection with the network device through a second terminal comprises:
sending first instruction information to the second terminal.

7. The network switching method according to claim 6, wherein the first instruction information comprises at least one of:
an acknowledgment message;
a paging message sent to the second terminal;
identification information of the first terminal;
instruction information for releasing the first network connection between the first terminal and the network device;
instruction information for performing network connection switching for the first terminal, wherein the network connection switching comprises: switching the first network connection between the first terminal and the network device to a second network connection between the first terminal and the second terminal;
instruction information for the first terminal and the second terminal to connect through a second network; or
a request message for switching a preset service from the first terminal to the second terminal.

8. The network switching method according to claim 1, wherein the instructing the first terminal to make a network connection with the network device through a second terminal comprises:
receiving second response information sent by the second terminal.

9. The network switching method according to claim 8, wherein the second response information comprises at least one of:
an acknowledgment response message;
a radio resource control (RRC) connection establishment request message; or
identification information of the first terminal.

10. The network switching method according to claim 1, wherein after the first terminal makes a network connection with the network device through a second terminal, the method further comprises at least one of:
sending second instruction information to the first terminal;
receiving request information sent by the first terminal for releasing the first network connection; or
releasing the first network connection with the first terminal.

11. The network switching method according to claim 1, further comprising:
establishing a radio resource control (RRC) connection with the second terminal; and/or
acquiring first information sent by a core network device; wherein the first information comprises at least one of:
a contract relationship between the first terminal and the second terminal;
identification information of the second terminal;
subscription information of the first terminal;
subscription information of the second terminal; or
application layer configuration information of the first terminal.

12. The network switching method according to claim 1, wherein the first network connection means that the first terminal or the second terminal is connected to or camps on a cellular network in RRC_Connected mode, RRC_Idle mode, or RRC_Inactive mode;
the second network connection means a non-cellular network connection between the first terminal and the second terminal.

13. A network device, comprising: a memory, a processor and a computer program that is stored in a memory and executable on a processor, wherein the computer program, when executed by the processor, causes the network device to perform:
responsive to a first network connection being established between the network device and a first terminal, instructing the first terminal to make a network connection with the network device through a second terminal; wherein
the first terminal is connected to the second terminal through a second network, and the second terminal is connected to the network device through the first network; wherein
the computer program, when executed by the processor, causes the network device to further perform:
receiving a second network switching request sent by the second terminal; wherein
the second network switching request comprises at least one of:
a radio resource control (RRC) connection establishment request message; or
identification information of the first terminal.

14. The network device according to claim 13, wherein the computer program, when executed by the processor, causes the network device to further perform:
releasing the first network connection with the first terminal.

15. The network device according to claim 13, wherein the second network switching request further comprises at least one of:
a request message for releasing the first network connection between the first terminal and the network device;
a request message for the first terminal to perform network connection switching, wherein the network connection switching comprises: switching the first network connection between the first terminal and the network device to a second network connection between the first terminal and the second terminal;
a message that the first terminal and the second terminal are connected through a second network;
a request message for switching a preset service from the first terminal to the second terminal;
identification information of the second terminal; or
auxiliary information sent by the second terminal to the first terminal.

* * * * *